(12) United States Patent
Carlson

(10) Patent No.: US 6,888,458 B2
(45) Date of Patent: May 3, 2005

(54) METHODS FOR TRACKING SILVICULTURAL INFORMATION

(75) Inventor: William C. Carlson, Olympia, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 10/414,595

(22) Filed: Apr. 15, 2003

(65) Prior Publication Data

US 2003/0218060 A1 Nov. 27, 2003

Related U.S. Application Data

(60) Provisional application No. 60/382,521, filed on May 21, 2002.

(51) Int. Cl.$^7$ ............................................. G08B 21/00
(52) U.S. Cl. ..................... 340/540; 340/572.1; 144/335
(58) Field of Search ............................. 340/540, 572.1, 340/572.8, 568.1; 235/285, 376; 144/335, 329, 336, 4.1; 47/58.1 R; 705/5, 7–10

(56) References Cited

U.S. PATENT DOCUMENTS

| | | |
|---|---|---|
| 6,182,725 B1 | 2/2001 | Sörvik |
| 6,341,632 B1 | 1/2002 | Sörvik |
| 6,671,698 B2 * | 12/2003 | Pickett et al. ............. 707/104.1 |

FOREIGN PATENT DOCUMENTS

| | | |
|---|---|---|
| AU | 200229317 A1 | 10/2002 |
| DE | 198 07 284 A1 | 9/1999 |
| WO | WO 01/97597 A1 | 12/2001 |

OTHER PUBLICATIONS

"What is Radio Frequency Identification (RFID)?," Aimglobal.org, n.d., □□<http://www.aimglobal.org/technologies/rfid/what_is_rfid.htm>.*

"The Precision Forestry Cooperative", University of Washington, Feb. 2002.□□<http://www.cfr.washington.edu/research.pfc/research/index/htm>.*

"RFID Helps Trees Stay Healthy," *Automatic ID News Europe* 8(1):22, 1999.

Wilson DM, "Diameter Sensing Using Radio Frequency Identification for Precision Forestry Application," *Precision Forestry: Proceedings of the First International Precision Forestry Cooperative Symposium*, UW Inst For. Res., Seattle Jun. 2001.

Ringstad MR, Radio Frequency Identification Slide Show, *Precision Forestry: Proceedings of the First International Precision Forestry Cooperative Symposium*, UW Inst For. Res., Seattle Jun. 2001.

Dykstra DP, "Technologies for Wood Tracking," pp iii–x, 1–3, 29–31 and 56–66; *Env Soc Dev E Asia Disc Paper*Dec. 2002.

"What is Radio Frequency Identification (RFID)?," Aimglobal.org, n.d., <http://www.aimglobal.org/technologies/rfid/what_is_rfid.htm> [retrieved May 3, 2002].

"RFID (Radio Frequency Identification)," *University of Washington PFC Precision Forestry Cooperative*, n.d. <http://www.cfr.washington.edu/research.pfc/research/index/htm> [retrieved May 9, 2002].

* cited by examiner

Primary Examiner—Jeffery Hofsass
Assistant Examiner—Eric Blount
(74) *Attorney, Agent, or Firm*—Christensen O'Connor Johnson Kindness PLLC

(57) ABSTRACT

The present invention provides methods for tracking silvicultural information during the product cycle of a tree. The methods of this aspect of the invention each include the step of storing a first portion of silvicultural information on a tag that is located proximate to a tree, or that is attached to a tree, and accessing the first portion of silvicultural information during the product cycle of the tree.

18 Claims, 4 Drawing Sheets

METHODS FOR TRACKING SILVICULTURAL INFORMATION

This application claims the benefit under Title 35 of United States Code 119(e) of provisional application 60/382,521 filed May 21, 2002.

FIELD OF THE INVENTION

This patent application relates to methods for tracking information relating to the cultivation, location, harvesting, processing, and/or properties of one or more trees.

BACKGROUND OF THE INVENTION

The demand for trees to make wood products continues to increase. Effective management and harvesting of forests requires knowledge of the properties of the individual trees within the forest. For example, a particular industry might require a consistent supply of wood having a hardness that falls within a specified range of hardness values. To satisfy this need, the forester must identify and propagate trees possessing the desired hardness characteristic, and track these trees, and logs and boards derived therefrom, through the logging and milling processes.

Consequently, there is a need for methods that permit tracking information relating to the growth and processing of trees, such as the location and properties of trees, and the location and properties of logs or boards derived therefrom. Preferably, the methods permit the information to be stored in a device associated with the tree, and/or associated with processed wood derived therefrom (e.g., logs and boards), and updated when desired.

SUMMARY OF THE INVENTION

In one aspect, the present invention provides methods for tracking silvicultural information during the product cycle of a tree. The methods of this aspect of the invention each include the step of storing a first portion of silvicultural information on a tag that is located proximate to a tree, or that is attached to a tree, and accessing said first portion of silvicultural information during the product cycle of the tree. For example, a tag can be attached to an external surface of a tree (e.g., the bark), or can be disposed within a portion of a tree (e.g., within the tree trunk), or can be attached to an object (e.g., a stake) proximate to a tree. Typically, tags record information in an electronic form. Representative examples of useful tags include Radio Frequency Identification tags and bar codes. Examples of the first portion of silvicultural information that can be stored on the tag includes the identity of the tree, location of the tree, growth rate of the tree, disease resistance of the tree and hardness of wood derived from the tree.

In some embodiments of the methods of the invention, a second portion of silvicultural information is stored in association with the first portion of silvicultural information. For example, the second portion of silvicultural information can be stored on the tag; in other embodiments, the second portion of silvicultural information is stored in a database separate from the tag (e.g., in an electronic database). In some embodiments, the first portion of silvicultural information includes the identity of the tree, which is used to access the second portion of silvicultural information which can include information about any aspect of the cultivation, location, harvesting, processing, and/or properties of the tree. In some embodiments, the methods of the invention are used to track silvicultural information with respect to a population of trees (e.g., a stand or forest of trees).

Some methods of the invention further include the steps of: (a) processing the tree to yield lumber; and (b) attaching a tag to the lumber, the tag bearing at least some of the first portion of silvicultural information, and/or at least some of the second portion of silvicultural information. Thus, for example, the tag attached to the lumber can include information about such properties as the quality and hardness of the lumber, and the identity and/or genotype of the tree from which the lumber was obtained.

The methods of the invention are useful in any situation in which it is desirable to track silvicultural information. For example, the methods of the invention can be used to promote efficient tree cultivation by tracking the location, age, and wood properties of a tree population (e.g., a population of cloned, genetically-identical, trees), and providing this information to computers that execute algorithms that facilitate such choices as the most desirable harvest time, the best processing facility to process the felled trees, and the availability of a purchaser for the trees or wood products derived therefrom. Thus, again by way of example, the methods of the invention provide the forester with ongoing information about a specified population of trees throughout the complete product cycle of the tree, from sapling to milled board (or other processed wood product); and can also provide the end-user of the milled board (or other processed wood product) with relevant information about the wood and its source.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1A:
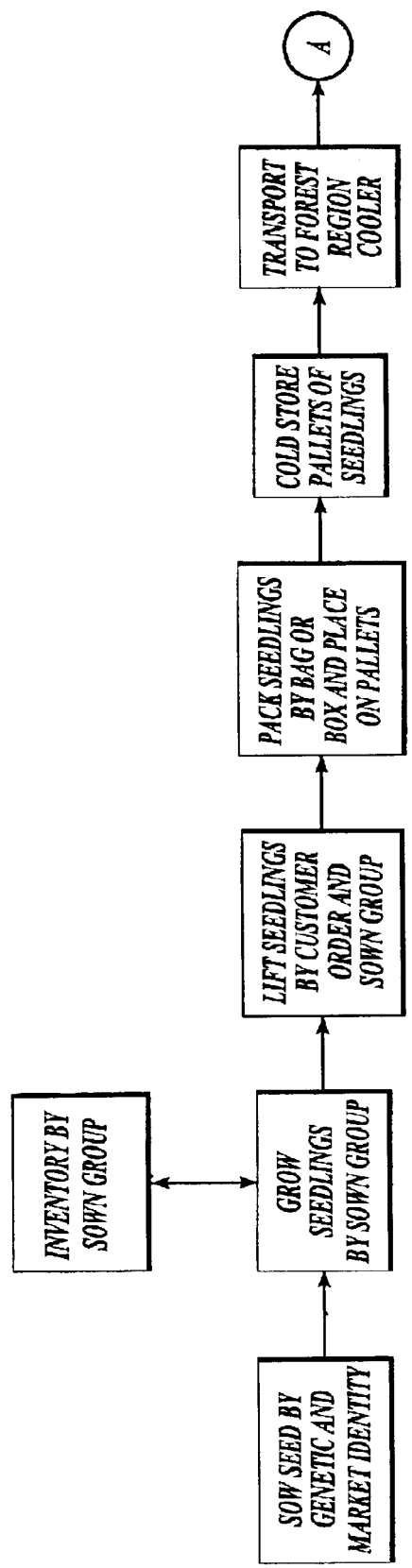
FIGS. 1A–D is a flow diagram that shows the use of a representative method of the invention to track silvicultural information during a representative product cycle for coniferous trees.

In one aspect, the present invention provides methods for tracking silvicultural information during the product cycle of a tree. The methods of this aspect of the invention each include the step of storing a first portion of silvicultural information on a tag that is located proximate to a tree, or that is attached to a tree, and accessing said first portion of silvicultural information during the product cycle of the tree. In some embodiments of the methods of the invention, a second portion of silvicultural information is stored in association with the first portion of silvicultural information.

As used herein, the term "silvicultural information" means information that relates to the cultivation, location, harvesting, processing, and/or properties of one or more trees. The following are representative examples of silvicultural information: the identity of the tree; information that describes the parentage of the tree, such as the identity of its parents, or the identity of the tree from which it was cloned; information about the physical, physiological, biochemical, genetic, morphological and/or disease-resistance characteristics of the tree (e.g., information about whether the tree was produced by cloning, or by a sexual cross, such as a controlled cross, open pollinated family cross, or polymix pollen cross); information about the location of the tree; information about culture of the tree as a seedling, such as whether the seedling was grown in a container or using a bareroot procedure, the amount of time that the seedling spent in a seed bed, and the amount of time that the seedling spent in a transplant bed; information about pesticides which have been applied to (or should be applied to) the tree; information about fertilizers applied to the tree, or which should be applied to the tree; information about pruning of the tree; information about the schedule for felling and/or transport of the tree to a wood processing facility (e.g., saw mill or pulp mill); and information about the type of processing to which the tree should be subjected (e.g., milling a log to yield boards).

As used herein, the term "product cycle of a tree" means the period from germinating the tree through processing the tree to yield one or more wood products.

As used herein, the term "portion of silvicultural information" can encompass a single item of information (e.g., the identity of a tree), or can encompass numerous items of information (e.g., information about the physical, physiological, biochemical, genetic, morphological and/or disease-resistance characteristics of the tree).

As used herein, in connection with first and second portions of silvicultural information, the term "stored in association" encompasses any type of association, including physical association (e.g., the first and second portions of silvicultural information are both stored on the same tag), and electronic association whereby the first portion of silvicultural information permits access to the electronically stored second portion of silvicultural information, or vice versa.

In the practice of the present invention, a first portion of silvicultural information is stored on one or more tags attached to a tree, or located proximate to a tree. Representative examples of silvicultural information are set forth supra. In some embodiments of the invention, the only information that is stored on the tag(s) is the identity of one or more trees. Other information about the tree(s)(i.e., a second portion of silvicultural information) is stored separately in one or more databases, such as computer databases. For example, the identity of the tree(s) may be stored in electronic form on a tag (e.g., a Radio Frequency Identification tag, as described more fully herein), and a forester can use an electronic reader to read the identity of the tree from the tag, and use the identity of the tree to access a second portion of silvicultural information about the tree from a computer database. The second portion of silvicultural information can be stored in an electronic database incorporated within the reader, or in a database that is separate from the reader. Thus, in these embodiments, the tag is only required to store a small amount of information (the identity of the tree), and can therefore be relatively cheap and technically unsophisticated.

The information stored on the tag, and/or in one or more databases, can encompass aspects of the complete product life of a tree, or population of trees. For example, the stored information can include instructions regarding the width of the tree beds into which seedlings are planted; instructions regarding the preparation of the tree plantation site; instructions regarding the mixture of trees (possessing different properties, such as different wood quality) to be planted at a specified site; instructions regarding the chemicals (e.g., pesticides and fertilizers) that should be applied to the trees; instructions for a pruning schedule; and instructions regarding a schedule for tree thinning and harvesting. To address ecological concerns, the stored information can also include information about flora and fauna that lives in association with the trees. The methods of the invention may therefore be used to manage at least one silvicultural procedure (e.g., fertilizing, pruning, thinning, harvesting and processing trees). Thus, the methods of the invention are particularly well adapted to assist a forester to implement complex schemes for the cultivation, harvesting and processing of mixed populations of trees.

Some tags permit information stored thereon to be augmented, or otherwise revised. For example, information about the growth rate of a tree (or population of trees), or disease resistance characteristics of a tree (or population of trees), may only become apparent during growth of the tree(s), and can be recorded on the tag when the information becomes available.

Although information about an individual tree may be stored on one or more tags located proximate to the tree, typically tags located proximate to a tree are used to store information about a population of trees. For example, a designated area of forest might be planted with a population of cloned, genetically-identical, trees. The forester may wish to maintain a record of information relating to the population of cloned trees. Thus, utilizing one embodiment of a method of the present invention, the forester can attach a tag to a stake located proximate to one or more trees in the cloned tree population, and record information about the cloned tree population on the tag. Typically a tag is located within about twenty feet (such as within about ten feet, or such as within about five feet) of one or more trees within the tree population.

In some embodiments, a tag is attached to an external surface of a tree (e.g., the bark of the tree), or is embedded within a tree, such as within the trunk. Thus, for example, a tag can be attached to the bark of a seedling, or can be deposited within the cambium of a seedling. An advantage of attaching a tag to the bark of a tree is that the tag is physically accessible, although it may be accidentally detached from the tree during the lifetime of the tree. An advantage of disposing a tag within a tree (e.g., within the trunk) is that the tag is protected from mechanical damage, or from becoming detached from the tree. The tag can be attached to the tree by any useful means (e.g., by use of an adhesive, by compression into the bark or xylem, by use of an attachment cord, such as a cord made from a durable plastic).

When a tree is harvested, the information on the tag can be accessed at any time during the harvesting and subsequent processing steps. For example, the information can be accessed immediately before a log is cut into boards, and a tag can be applied to all of the resulting boards. The tag attached to the boards can include some, or all, of the first and/or second portions of information relating to the tree from which the boards are derived.

In the practice of the invention, one type of tag can be attached to a tree (or located proximate to a tree), and a different type of tag can be attached to processed wood derived therefrom (e.g., to log(s) and board(s) derived from the tree). For example, a Radio Frequency Identification tag can be attached to a tree, and can include a large amount of information relating, for example, to the growth characteristics, disease-resistance characteristics, and wood-quality characteristics, of the tree. A less sophisticated tag, capable of storing only a fraction of the information stored by the Radio Frequency Identification tag, may be attached to each board derived from the tree, and may include only the information relevant to the end user of the board (e.g., information relating to the mechanical properties of the wood).

Tags useful in the practice of the invention are capable of storing information in a form that can be retrieved from the tag (e.g., for inspection, storage, or analysis of the information). Some tags are read-write tags (i.e., the information stored on the tag can be augmented, updated, or otherwise altered). Some tags are read-only tags (i.e., the information stored on the tag can only be read, but cannot be augmented, updated, or otherwise altered after the information is deposited on the tag). Representative examples of useful tags include Radio Frequency Identification tags, such as the Radio Frequency Identification tags available from Alien Technology Corporation, 18410 Butterfield Boulevard, Suite 150, Morgan Hill, Calif. 95037. Radio Frequency Identification tags are available in numerous configurations, such as nail tags, injectable tags, glass tags and button tags.

Typically, use of a Radio Frequency Identification tag requires three components: an antenna or coil, a transceiver (with decoder), and a tag that is electronically programmed with information. The antenna emits radio signals to activate the tag and, in some embodiments, read and write information to it. Antennas are the conduits between the tag and the transceiver, which controls information acquisition and communication by the system. The electromagnetic field produced by an antenna can be constantly present, or can be activated by a sensor device when the tag is being interrogated, or when information is being deposited on the tag.

The antenna may be packaged with the transceiver and decoder to form a reader, which can be configured, for example, as a handheld or a fixed-mount device. The reader emits radio waves, typically in the range of from one inch to 100 feet or more, depending upon its power output and the radio frequency used. When a Radio Frequency Identification tag passes through the electromagnetic zone, it detects the activation signal of the reader. The reader decodes the information encoded in the tag's integrated circuit and the information may then be passed to a computer for processing.

Radio Frequency Identification tags can be active or passive. Active Radio Frequency Identification tags are powered by an internal battery and are typically read-write, i.e., tag information can be rewritten and/or modified. The memory size of an active tag varies according to application requirements; some systems operate with up to 1 MB of memory. Passive Radio Frequency Identification tags operate without a separate external power source and obtain operating power from the reader. Passive tags are consequently much lighter than active tags, less expensive, and offer a virtually unlimited operational lifetime. Read-only tags are typically passive and are programmed with a unique set of information (usually 32 to 128 bits) that cannot be modified.

Radio Frequency Identification tag systems are also distinguished by their frequency ranges. Some systems utilize low-frequency (e.g., 30 KHz to 500 KHz), and have relatively short reading ranges. Some systems utilize high-frequency (e.g., 850 MHz to 950 MHz and 2.4 GHz to 2.5 GHz), and have relatively long read ranges (e.g., greater than 90 feet) and high reading speeds.

A significant advantage of all types of Radio Frequency Identification tag systems is that they can read through a variety of substances such as snow, fog, ice, crusted grime, and other visually and environmentally challenging conditions, where barcodes or other optically-read technologies may be impaired.

Another example of a useful tag is a barcode. For example, a tree can be tagged with a Radio Frequency Identification tag which can include information regarding numerous aspects of the growth, disease resistance, and other properties of the tree. When the tree is harvested and milled to yield wooden boards, a barcode can be applied to each board that includes only those portions of the information stored on the Radio Frequency Identification tag that is of interest to the end-user of the board.

In the practice of the present invention, information about one or more trees can be stored in a computer database, and the information stored on a tag (e.g., the identity of a tree) can be used to access silvicultural information in the database. The database can, for example, include information about one or more populations of trees and thereby maintain a timber inventory. The database can, for example, also include real-time information relating to the capacity of lumber mills to process lumber, and thereby correlate the availability of lumber with the capacity of one or more mills to process it. Similarly, and again by way of example, the database can include information about the commercial demand for lumber possessing one or more desirable characteristics, and can assist an operator to decide when and where to harvest lumber.

Thus, in another aspect, the present invention provides systems for tracking silvicultural information during the product cycle of a tree. The systems each include: (a) at least one tag, on which is stored a first portion of silvicultural information, that is located proximate to a tree, or that is attached to a tree; (b) a database on which a second portion of silvicultural information is stored; and (c) a computer that tracks the first and second portions of silvicultural information during the product cycle of the tree. It will be understood that the systems of the invention can include a multiplicity of tags that store silvicultural information about one or more populations of trees. Thus, in some embodiments, the computer utilizes information stored on the multiplicity of tags to track silvicultural information during the product cycle of the tree population(s). In some embodiments of the systems of the invention, the computer utilizes the first and second portions of silvicultural information to direct the culture, harvesting and/or processing of one or more trees. For example, the computer can utilize the first and second portions of silvicultural information to provide instructions to a human or mechanical operator to apply fertilizer to a tree population, to prune a tree population, to harvest a tree population, to transport felled trees to a particular processing facility (e.g., saw mill), and/or to ship processed wood products (e.g., milled boards) to a particular customer.

The following examples merely illustrate the best mode now contemplated for practicing the invention, but should not be construed to limit the invention.

EXAMPLE 1

This Example describes the use of a representative method of the invention to track silvicultural information during a representative product cycle for coniferous trees.

Figure 1B:
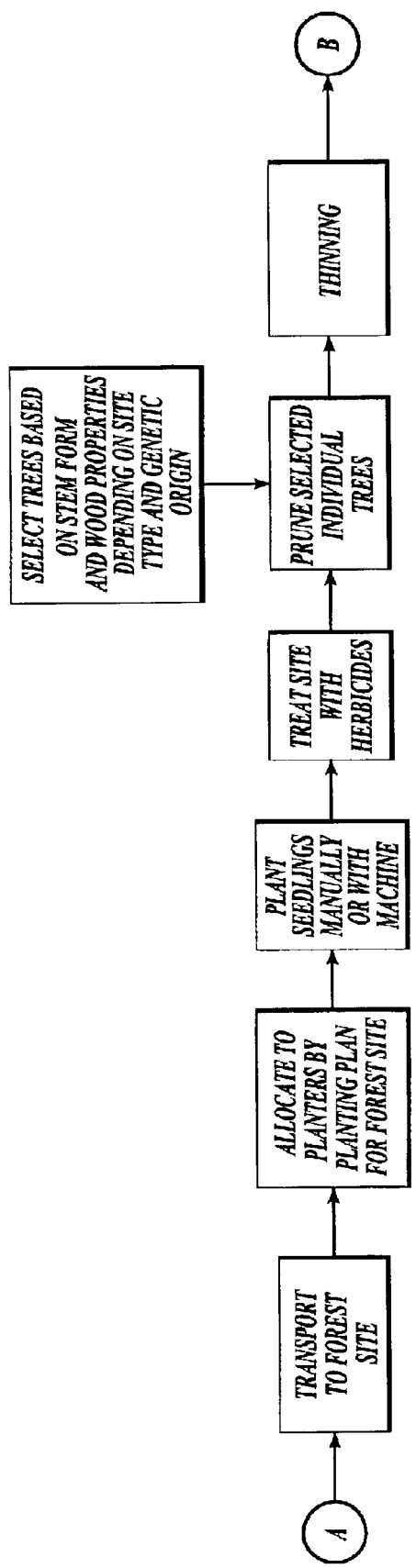
Figure 1C:
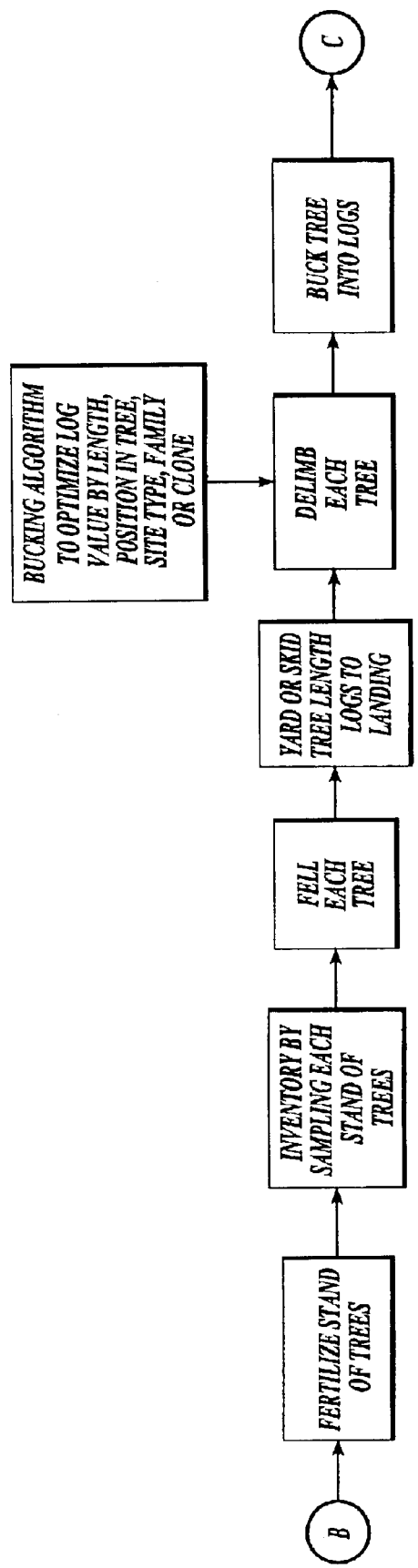
Figure 1D:
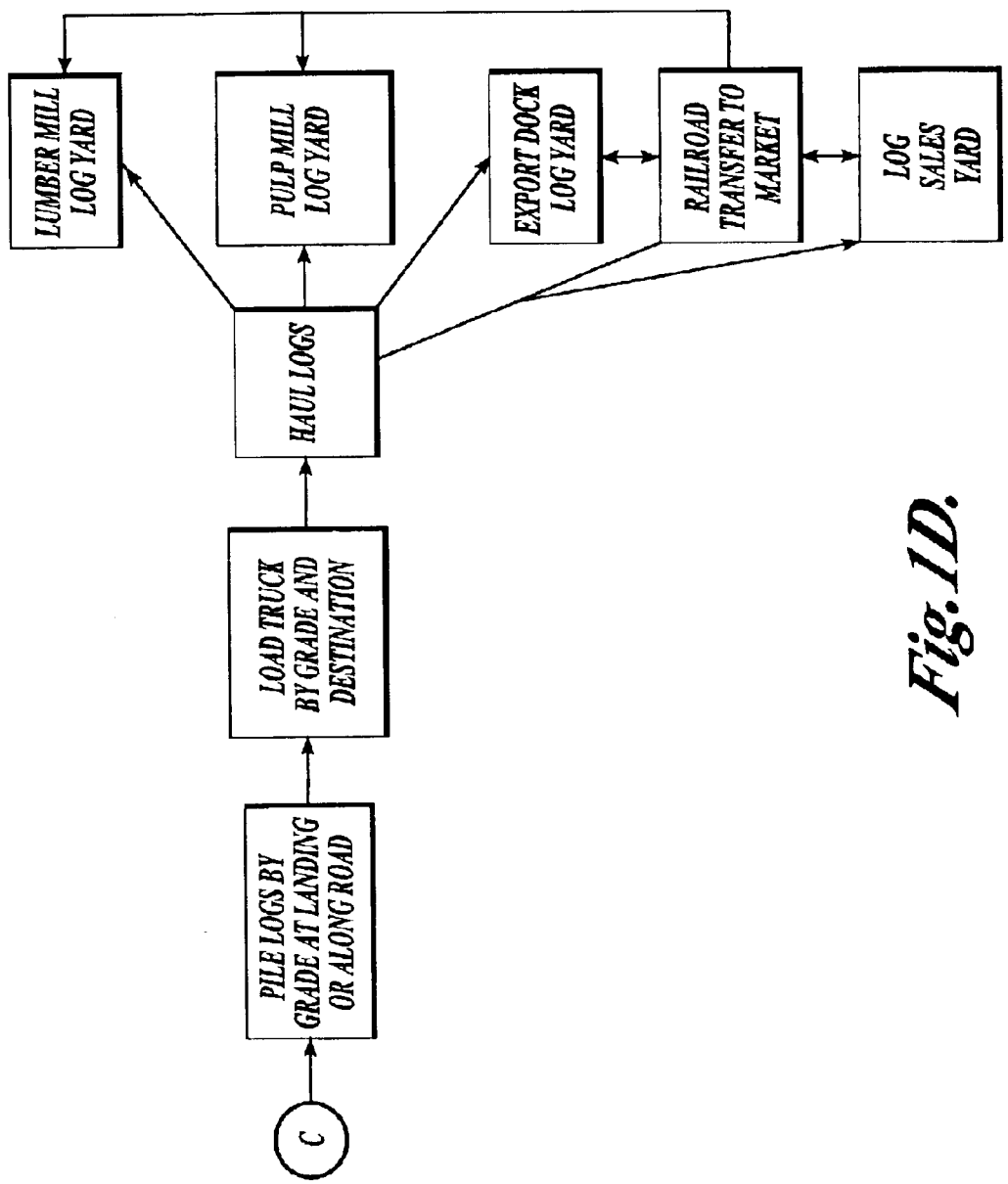

The following description of the use of a representative method of the invention is made with reference to FIGS. 1A–D. Seed is sown in groups based on the genetic identity of the seed (e.g., genetically-identical cloned seed is sown together), and/or the market identity of the seed (e.g., a customer places an order for lumber produced from trees identified by a trade name or other commercial designation). Seedlings are grown from the sown seed and are inventoried based on the characteristic (e.g., genetic identity) that was used to define the seed group. The seedlings are then lifted based on the grouping in which they were planted, or in response to a customer order for trees possessing specific characteristics. The seedlings are packed into bags or boxes, and placed onto pallets. The pallets are stored in the cold and then transported to a regional forest cooler.

The seedlings are then transported to a forest site and allocated to planters based on the planting plan for the site. The seedlings are manually planted, or planted using a machine, and the plantation is treated with a herbicide. When the trees have grown to an appropriate height, trees are selected based on such properties as height, stem morphology and wood properties. The selected trees are pruned, and undesirable trees are removed (i.e., the tree population is thinned). The remaining trees are further fertilized and allowed to grow, and are again inventoried to identify trees possessing desirable characteristics (e.g., wood quality).

When the trees have grown by a desired amount, the trees are felled and moved to a landing where the limbs are removed. A bucking algorithm can be utilized to direct the bucking process (i.e., conversion of the trees into logs). The bucking algorithm helps to identify trees, and portions of tree trunks, that yield logs having desired characteristics. The resulting logs are piled, in groups that possess the same property or properties, at a landing or along a road. The logs are loaded onto trucks based on the grade of the log, and the destination, and transported to a wood processing facility (e.g., lumber mill, pulp mill), or to an export site, or a sale yard.

In accordance with the present invention, silvicultural information can be tracked throughout the product cycle described in this Example. Thus, for example, a read-only Radio Frequency Identification tag is attached to a stake, or other physical support, that is located proximate to the sown seed group. The tag includes the identity of the seed group (e.g., all of the seed in the group may be derived from a cloned, genetically-identical, population of conifers that possesses desirable wood properties). When the germinated seedlings are lifted, and packed into containers before transportation to a forest site, a tag is attached to each container that includes the identity of the seed group.

The seedlings are planted together as a group, and a tag is attached to a stake that is located proximate to one or more seedlings in the group (e.g., the tag is located within twenty feet of a seedling located at the edge of the group). During subsequent growth and maintenance of the trees, information about the treatments that the trees have received (e.g., application of pesticides), and information about the properties of the trees (e.g., their wood quality as this becomes apparent during growth of the trees) is stored on a computer database. This information can be accessed by a forester utilizing a hand-held reader which reads the identity of the trees from the tag, and which then accesses the corresponding information in the database.

When the trees are harvested, a tag is attached to each tree, and log derived therefrom, which includes the identity of the tree. The tag is read by processing equipment, such as an automated saw, which processes the wood, in accordance with instructions received from a computer, based on information about the tagged wood in the database. A tag may also be applied to wood products derived from the tagged trees to provide the purchaser with desired information about the wood.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

What is claimed is:

1. A method for tracking silvicultural information during the product cycle of a tree, said method comprising the step of storing a first portion of silvicultural information on an electronically programmed tag that is located proximate to a tree, or that is attached to a tree, and accessing said first portion of silvicultural information on at least one occasion during growth of the tree, on at least one occasion during harvesting of the tree, and on at least one occasion during processing of the tree.

2. The method of claim 1 wherein said method further comprises:
    (a) storing a second portion of silvicultural information in association with said first portion of silvicultural information;
    (b) processing the tree to yield lumber; and
    (c) attaching a tag to the lumber, said tag bearing at least some of the first portion of silvicultural information, or at least some portion of the second portion of silvicultural information.

3. The method of claim 1 wherein the tag is attached to the tree.

4. The method of claim 3 wherein the tag is attached to an external surface of the tree.

5. The method of claim 3 wherein the tag is disposed within the tree.

6. The method of claim 1 wherein the tag is located proximate to the tree.

7. The method of claim 6 wherein the tag is located within twenty feet of the tree.

8. The method of claim 2 wherein the second portion of silvicultural information is stored on the tag.

9. The method of claim 2 wherein the second portion of silvicultural information is stored in a database that is separate from the tag.

10. The method of claim 9 wherein the database is an electronic database.

11. The method of claim 1 wherein the first portion of silvicultural information comprises the identity of the tree.

12. The method of claim 1 wherein the first portion of silvicultural information consists of the identity of the tree.

13. The method of claim 2 wherein the second portion of silvicultural information comprises information about at least one parameter selected from the group of parameters consisting of genetic identity, growth rate, wood quality, disease resistance, treatment with fertilizer, treatment with pesticide, pruning and geographical location.

14. The method of claim 2 wherein the combination of the first and second portions of silvicultural information is used to manage at least one silvicultural procedure.

15. The method of claim 14 wherein the silvicultural procedure is selected from the group consisting of fertilizing one or more trees, applying pesticide to one or more trees, harvesting one or more trees, transporting one or more harvested trees and processing one or more trees.

16. The method of claim 1 wherein the tag is a Radio Frequency Identification tag.

17. The method of claim 16 wherein the tag is a read/write tag.

18. The method of claim 16 wherein the tag is a read-only tag.

* * * * *